(12) United States Patent
Curran et al.

(10) Patent No.: US 10,698,796 B2
(45) Date of Patent: Jun. 30, 2020

(54) NON-TRANSITORY COMPUTER-READABLE MEDIUM, INFORMATION PROCESSING APPARATUS, DEBUGGING SYSTEM AND DEBUGGING METHOD

(71) Applicant: SoftGear Co., Ltd., Tokyo (JP)

(72) Inventors: Declan Curran, Tokyo (JP); Kengo Aoki, Tokyo (JP); Naoki Miyanaga, Tokyo (JP); Przemyslaw Majerczak, Tokyo (JP)

(73) Assignee: SoftGear Co., Ltd., Tokyo (JP)

( * ) Notice: Subject to any disclaimer, the term of this patent is extended or adjusted under 35 U.S.C. 154(b) by 0 days.

(21) Appl. No.: 16/190,543

(22) Filed: Nov. 14, 2018

(65) Prior Publication Data

US 2019/0235995 A1 Aug. 1, 2019

Related U.S. Application Data

(63) Continuation of application No. PCT/JP2018/007259, filed on Feb. 27, 2018.

(30) Foreign Application Priority Data

Feb. 1, 2018 (JP) .................. 2018-016373

(51) Int. Cl.
*G06F 11/36* (2006.01)
(52) U.S. Cl.
CPC ........ *G06F 11/3672* (2013.01); *G06F 11/362* (2013.01)
(58) Field of Classification Search
CPC .............. G06F 11/362; G06F 11/3672

USPC ................................... 717/124–135
See application file for complete search history.

(56) References Cited

U.S. PATENT DOCUMENTS

| 5,463,768 A * | 10/1995 | Cuddihy | G06F 11/2205 714/37 |
| 6,028,970 A * | 2/2000 | DiPiazza | G06K 9/03 382/229 |
| 7,779,021 B1 * | 8/2010 | Smith | G06F 11/3438 707/760 |
| 9,992,269 B1 * | 6/2018 | Odom | G06F 16/24568 |
| 10,110,772 B2 * | 10/2018 | Wang | H04N 1/32609 |
| 10,152,366 B2 * | 12/2018 | Togawa | G06F 11/079 |
| 2004/0158838 A1 * | 8/2004 | Tracey | G06F 9/5055 719/316 |
| 2006/0077726 A1 * | 4/2006 | Shimmitsu | G06F 11/2094 365/189.05 |
| 2008/0127111 A1 * | 5/2008 | Perlman | G06F 11/3612 717/128 |

(Continued)

FOREIGN PATENT DOCUMENTS

JP 2000-293399 A 10/2000

*Primary Examiner* — Marina Lee
(74) *Attorney, Agent, or Firm* — Hauptman Ham, LLP

(57) ABSTRACT

A debugging apparatus sequentially receives logs generated accompanying an operation of a program to be debugged along with lapse of time, sets the logs in a predetermined range as processing batch data to be batch-processed, and groups the processing batch data. If the set of grouped logs does not satisfy the condition, the group is determined to be in an incomplete state and recorded, and when there exist common groups between the new processing batch data and the incomplete group, the log data of the incomplete group is added to the new processing data.

12 Claims, 11 Drawing Sheets

(56) References Cited

U.S. PATENT DOCUMENTS

| | | | |
|---|---|---|---|
| 2010/0241894 A1* | 9/2010 | Patel | G06F 11/2007 |
| | | | 714/4.12 |
| 2010/0306315 A1* | 12/2010 | Smith | G06Q 30/02 |
| | | | 709/203 |
| 2011/0185234 A1* | 7/2011 | Cohen | G06F 11/3476 |
| | | | 714/37 |
| 2013/0036405 A1* | 2/2013 | Verbest | G06F 11/3672 |
| | | | 717/131 |
| 2013/0067298 A1* | 3/2013 | Li | G06F 11/3688 |
| | | | 714/799 |
| 2013/0262931 A1* | 10/2013 | Siddalingesh | G06F 11/3672 |
| | | | 714/28 |
| 2014/0282031 A1* | 9/2014 | Hinterbichler | G06F 11/3656 |
| | | | 715/738 |
| 2016/0224402 A1* | 8/2016 | Togawa | G06F 11/0778 |
| 2017/0063762 A1* | 3/2017 | Machol | H04L 51/18 |
| 2018/0307551 A1* | 10/2018 | Bacha | G06F 11/0751 |
| 2019/0235995 A1* | 8/2019 | Curran | G06F 11/3672 |

\* cited by examiner

FIG. 3

*111a LOG DATA*

Database

| ID | Timestamp | Event ID | Node | Operation | Parent Node |
|---|---|---|---|---|---|
| 2378964 | 2017-10-02 04:21:02 | 131145 | 8 | CREATE | 4 |
| 2378965 | 2017-10-04 02:52:26 | 131145 | 4 | REFRESH | 1 |
| 2378966 | 2017-10-05 15:31:29 | 131146 | 5 | DELETE | 1 |
| 2378967 | 2017-10-06 00:37:38 | 131146 | 6 | CASCADE | 5 |
| 2378968 | 2017-10-08 05:47:18 | 131146 | 7 | CASCADE | 5 |
| 2378969 | 2017-10-10 03:58:30 | 131146 | 1 | REFRESH | NULL |
| 2378970 | 2017-10-10 22:25:37 | 131147 | 8 | DELETE | 4 |

1110 ADDITIONAL LOG

Database

| ID | Timestamp | Event ID | Node | Operation | Parent Node |
|---|---|---|---|---|---|
| 2378964 | 2017-10-02 04:21:02 | 131145 | 8 | CREATE | 4 |
| 2378965 | 2017-10-02 04:24:26 | 131145 | 4 | REFRESH | 1 |
| 2378966 | 2017-10-06 00:32:29 | 131146 | 5 | DELETE | 1 |
| 2378967 | 2017-10-06 00:37:38 | 131146 | 6 | CASCADE | 5 |
| 2378968 | 2017-10-06 00:38:18 | 131146 | 7 | CASCADE | 5 |
| 2378969 | 2017-10-06 00:38:30 | 131146 | 1 | REFRESH | NULL |
| 2378970 | 2017-10-10 22:25:37 | 131147 | 8 | DELETE | 4 |
| 2378971 | 2017-10-10 22:28:37 | 131147 | 4 | REFRESH | 1 |

1111 PREVIOUS SELECTION LOG

1112 SELECTION LOGS

FIG. 5

*112a PROCESSING BATCH DATA*

Processing Batch - Data Object Rows

| ID | Timestamp | Event ID | Node | Operation | Parent Node |
|---|---|---|---|---|---|
| 2378964 | 2017-10-02 04:21:02 | 131145 | 8 | CREATE | 4 |
| 2378965 | 2017-10-02 04:24:26 | 131145 | 4 | REFRESH | 1 |
| 2378966 | 2017-10-06 00:32:29 | 131146 | 5 | DELETE | 1 |
| 2378967 | 2017-10-06 00:37:38 | 131146 | 6 | CASCADE | 5 |
| 2378968 | 2017-10-06 00:38:18 | 131146 | 7 | CASCADE | 5 |
| 2378969 | 2017-10-06 00:38:30 | 131146 | 1 | REFRESH | NULL |
| 2378970 | 2017-10-10 22:25:37 | 131147 | 8 | DELETE | 4 |
| 2378971 | 2017-10-10 22:28:37 | 131147 | 4 | REFRESH | 1 |

| Processing Batch - Groups List | | | | | |
|---|---|---|---|---|---|
| ID | Timestamp | Event ID | Node | Operation | Parent Node |
| Group Key: 131145 | | | | | |
| 2378964 | 2017-10-02 04:21:02 | 131145 | 8 | CREATE | 4 |
| 2378965 | 2017-10-02 04:24:26 | 131145 | 4 | REFRESH | 1 |
| Group Key: 131146 | | | | | |
| 2378966 | 2017-10-06 00:32:29 | 131146 | 5 | DELETE | 1 |
| 2378967 | 2017-10-06 00:37:38 | 131146 | 6 | CASCADE | 5 |
| 2378968 | 2017-10-06 00:38:18 | 131146 | 7 | CASCADE | 5 |
| 2378969 | 2017-10-06 00:38:30 | 131146 | 1 | REFRESH | NULL |
| Group Key: 131147 | | | | | |
| 2378970 | 2017-10-10 22:25:37 | 131147 | 8 | DELETE | 4 |
| 2378971 | 2017-10-10 22:28:37 | 131147 | 4 | REFRESH | 1 |

US 10,698,796 B2

NON-TRANSITORY COMPUTER-READABLE MEDIUM, INFORMATION PROCESSING APPARATUS, DEBUGGING SYSTEM AND DEBUGGING METHOD

The present application is based on and claims the benefit of priority from the prior Japanese patent application No. 2018-016373 filed on Feb. 1, 2018, and PCT Application No. PCT/JP2018/007259 filed Feb. 27, 2018, the entire contents of which are incorporated herein by reference.

BACKGROUND OF THE INVENTION

Field of the Invention

One embodiment of the invention relates to a non-transitory computer-readable medium, an information processing apparatus, a debugging system, and a debugging method.

Description of the Related Art

In order to debug a program, such as an application, it is necessary to collect a history (hereinafter also referred to as "log") in which events caused by execution of an application are recorded along with lapse of time and to analyze and process a group of logs (also referred to as "group" of logs) recorded by the application executing one operation.

As a conventional technique, an information processing apparatus for automatically debugging a program which needs to determine an establishment condition of an event has been proposed (see, for example, JP 2000-293399 A).

The information processing apparatus disclosed in JP 2000-293399 A determines in an event detector whether or not a received command includes a batch description concerning an event, sets an establishment flag for indicating establishment of the event to ON when the event detector detects the existence of the event, and when the establishment flag is ON, automatically debugs a program by event information analysis means executing batch processing at the time of establishment of the event.

However, the information processing apparatus of JP 2000-293399 A automates debugging when a command includes a batch description concerning an event, but assumes only a case where logs recorded as a result of executing a command and operating are batch-processed as a batch and does not assume a case where logs are divided into a plurality of sets of logs and processed respectively. In addition, there is no assumption of a situation in which data constituting plural kinds of operations are executed in random order, and plural kinds of logs to be recorded as a result are batch-processed. That is, in a situation in which a plurality of types of applications and services are operated, logs are received from these along with lapse of time, and data in a certain period including logs of a plurality of kinds of groups are batch-processed, in a case where logs of a certain group are included over a plurality of units of batch processing, the information processing apparatus of JP 2000-293399 A treats it as a set of incomplete logs or determines it as an error as a result of debugging as the data is imperfect in the unit of batch processing, and there is a problem that debugging cannot be done correctly.

BRIEF DESCRIPTION OF DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary schematic diagram for explaining a log reception operation of the debugging apparatus;

FIG. 4 is an exemplary schematic diagram for explaining a batch data selection operation of the debugging apparatus;

FIG. 5 is an exemplary schematic diagram showing a configuration of batch data before the debugging apparatus groups the batch data;

FIG. 6 is an exemplary schematic diagram showing a configuration of batch data after the debugging apparatus has grouped the batch data;

DETAILED DESCRIPTION OF THE PREFERRED EMBODIMENT

Figure 1:
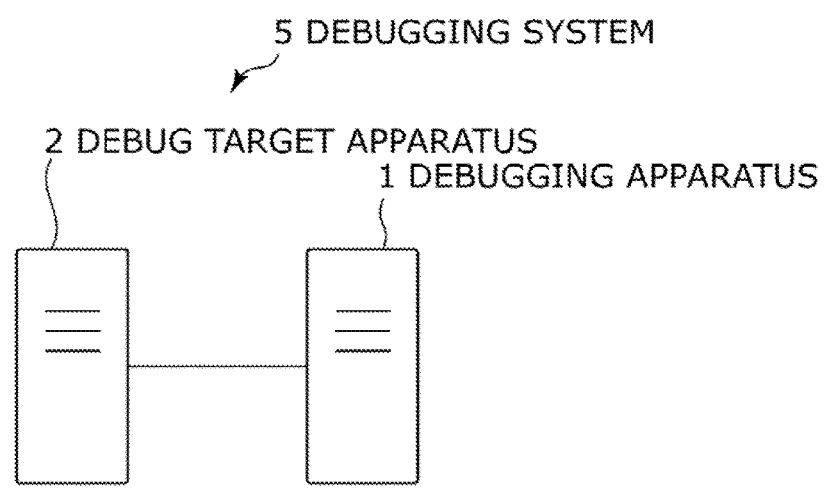
FIG. 1 is an exemplary schematic diagram showing an example of a configuration of a debugging system according to an embodiment.

Various embodiments according to the invention will be described hereinafter with reference to the accompanying drawings. In general, according to one embodiment of the invention, there are provided a non-transitory computer-readable medium, an information processing apparatus, a debugging system and a debugging method.

A non-transitory computer-readable medium recording an information processing program for causing a computer to function as:

a processing data selection unit that selects logs in a predetermined range as processing batch data to be batch-processed from a log data string that is obtained by sequentially receiving logs generated accompanying an operation of a program to be debugged along with lapse of time;

a grouping unit that groups the processing batch data selected by the processing data selection unit on the basis of a field of a log;

a group processing unit that, in a case where a set of logs grouped by the grouping unit has a defect in comparison with a predetermined condition, determines that the group is in an incomplete state and records the group as an incomplete result; and an incomplete group processing unit that, in a case where after the processing data selection unit has selected new processing batch data after the processing batch data and the grouping unit has grouped the new processing batch data, there exist groups having a common value in a field with which the grouping unit has performed grouping between the new processing batch data and the group which has been determined to be an incomplete result by the group processing unit, replaces log data of the common group in the new processing batch data with every log data belonging to the common groups.

An information processing apparatus including:

a processing data selection unit that selects logs in a predetermined range as processing batch data to be batch-processed from a log data string that is obtained by sequentially receiving logs generated accompanying an operation of a program to be debugged along with lapse of time;

a grouping unit that groups the processing batch data selected by the processing data selection unit on the basis of a field of a log;

a group processing unit that, in a case where a set of logs grouped by the grouping unit has a defect in comparison with a predetermined condition, determines that the group is in an incomplete state and records the group as an incomplete result; and an incomplete group processing unit that, in a case where after the processing data selection unit has selected new processing batch data after the processing batch data and the grouping unit has grouped the new processing batch data, there exist groups having a common value in a field with which the grouping unit has performed grouping between the new processing batch data and the group which has been determined to be an incomplete result by the group processing unit, replaces log data of the common group in the new processing batch data with every log data belonging to the common groups.

A debugging system including:

a debug target apparatus that sequentially outputs logs generated accompanying an operation of a program to be debugged along with lapse of time; and an information processing apparatus including, a processing data selection unit that selects logs in a predetermined range as processing batch data to be batch-processed from a log data string that is obtained by sequentially receiving logs generated accompanying an operation of a program to be debugged along with lapse of time, a grouping unit that groups the processing batch data selected by the processing data selection unit on the basis of a field of a log;

a group processing unit that, in a case where a set of logs grouped by the grouping unit has a defect in comparison with a predetermined condition, determines that the group is in an incomplete state and records the group as an incomplete result; and an incomplete group processing unit that, in a case where after the processing data selection unit has selected new processing batch data after the processing batch data and the grouping unit has grouped the new processing batch data, there exist groups having a common value in a field with which the grouping unit has performed grouping between the new processing batch data and the group which has been determined to be an incomplete result by the group processing unit, replaces log data of the common group in the new processing batch data with every log data belonging to the common groups.

A debugging method including the steps of:

selecting logs in a predetermined range as processing batch data to be batch-processed from a log data string that is obtained by sequentially receiving logs generated accompanying an operation of a program to be debugged along with lapse of time;

grouping the processing batch data selected by the processing data selection unit on the basis of a field of a log;

in a case where a set of logs grouped by the grouping unit has a defect in comparison with a predetermined condition, determining that the group is in an incomplete state and recording the group as an incomplete result; and in a case where after new processing batch data is selected after the processing batch data and the grouping unit has grouped the new processing batch data, there exist groups having a common value in a field with which grouping has been performed in the step of performing grouping between the new processing batch data and the group which has been determined to be an incomplete result by the group processing unit, replacing log data of the common group in the new processing batch data with every log data belonging to the common groups.

According to an object of one embodiment of the invention, in a case of batch-processing a log data string sequentially received along with elapse of time and even in a case where a series of logs extend across a plurality of pieces of batch data, it is possible to prevent a result of debugging from becoming erroneous.

Embodiment

Configuration of Debugging System

FIG. 1 is an exemplary schematic diagram showing an example of a configuration of a debugging system according to an embodiment.

This debugging system 5 is configured by connecting a debugging apparatus 1 as an information processing apparatus and a debug target apparatus 2 so as to communicate with each other via a network.

The debugging apparatus 1 is a server type information processing apparatus and operates in response to a request from a terminal (not shown) operated by an operator, and includes, in the main body, a CPU (Central Processing Unit) having a function for processing information, and an HDD (Hard Disk Drive) or an electronic part, such as a flash memory. The debugging apparatus 1 sequentially receives logs from the debug target apparatus 2 along with lapse of time, sequentially performs batch processing on the received logs, analyzes a group of logs, and executes debugging.

The debug target apparatus 2 is a terminal type or server type information processing apparatus and operates based on a program to be debugged, and includes, in the main body, a CPU (Central Processing Unit) having a function for processing information, and an HDD or an electronic part, such as a flash memory. The debug target apparatus 2 operates based on a program and sequentially outputs logs as a result of the operation to the debugging apparatus 1. It should be noted that the debug target apparatus 2 executes plural kinds of operations in order or in parallel in accordance with a program, and logs of each operation are outputted randomly along with lapse of time.

The network is a communication network capable of high-speed communication, and is, for example, a wired or wireless communication network, such as an intranet or a LAN (Local Area Network).

As an example, the debugging apparatus 1 functions as described above by operating middleware such as Fluentd, Elasticsearch, or Hadoop, collects logs mainly by Fluentd, preserves logs by Elasticsearch, and analyzes and summarizes logs by Hadoop. It should be noted that the debugging apparatus 1 may be configured by a plurality of clusters or may be configured to execute distributed processing by Apache Spark.

Note that in FIG. 1, the debugging apparatus 1 and the debug target apparatus 2 are drawn by a single apparatus for the purpose of simplifying the explanation, but each function may be divided into a plurality of apparatuses and operated, or the operation may be processed in a distributed manner by a plurality of apparatuses. Further, the debugging apparatus 1 and the debug target apparatus 2 may be configured in a single apparatus.

The configuration of the debug target apparatus 2 is not particularly limited as long as the program operates on it and it outputs the result log of the operation. Without provision of the debug target apparatus 2, a configuration may be adopted in which only log data is prepared and processed by the debugging apparatus 1.

Configuration of Debugging Apparatus

Figure 2:
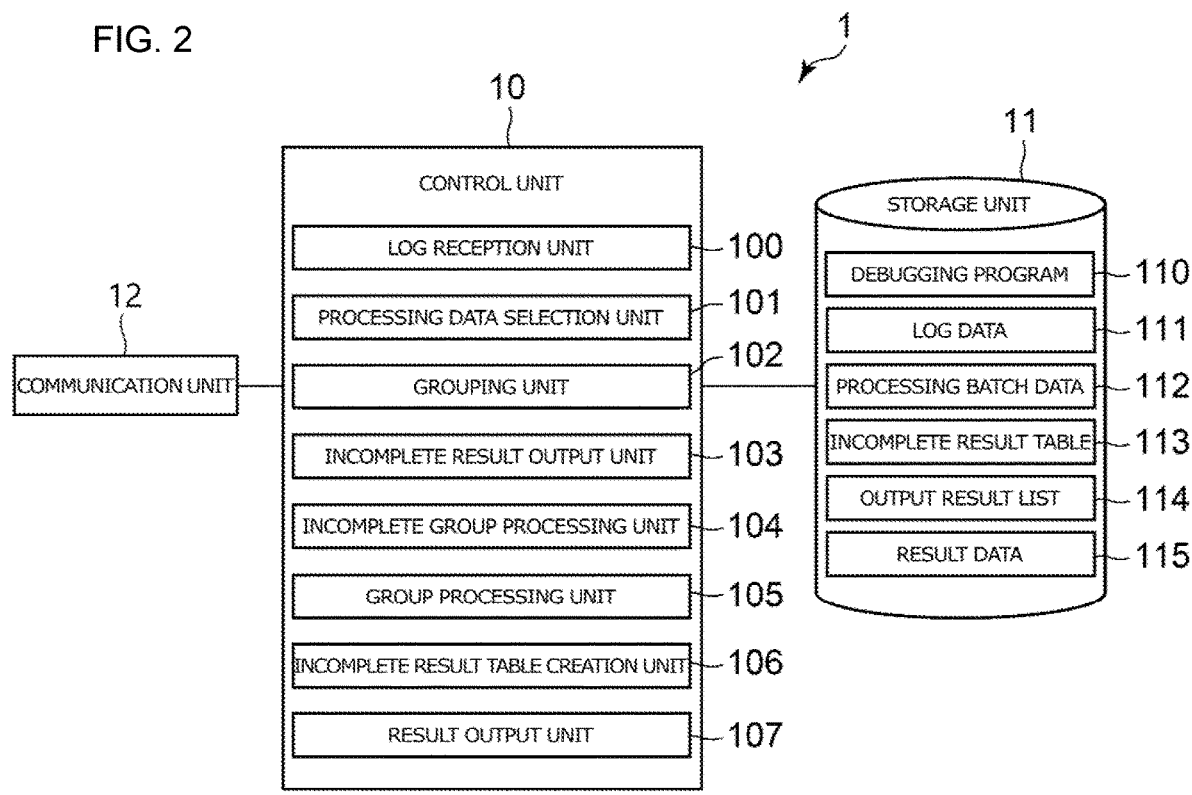
FIG. 2 is an exemplary block diagram showing a configuration example of a debugging apparatus according to the embodiment.

FIG. 2 is an exemplary block diagram showing a configuration example of the debugging apparatus 1 according to the embodiment.

The debugging apparatus 1 includes a control unit 10 that is configured from a CPU and the like and controls each unit and executes various programs, a storage unit 11 that is configured from a storage medium, such as a flash memory, and stores information, and a communication unit 12 that communicates with the outside via a network.

By executing a debugging program 110 as an information processing program to be described later, the control unit 10 functions as a log reception unit 100, a processing data selection unit 101, a grouping unit 102, an incomplete result output unit 103, an incomplete group processing unit 104, a group processing unit 105, an incomplete result table creation unit 106, a result output unit 107, and the like.

The log reception unit 100 sequentially receives logs, which are the result of operation of the program to be debugged in the debug target apparatus 2, from the debug target apparatus 2 along with lapse of time and stores them in the storage unit 11 as log data 111. That is, the data amount of the log data 111 increases along with lapse of time.

The processing data selection unit 101 selects data to be processed from the log data 111 and stores it in the storage unit 11 as processing batch data 112. New data is sequentially created as the processing batch data 112.

The grouping unit 102 groups the processing batch data 112 for each type of operation of the program with, for example, an event ID or the like.

The incomplete result output unit 103 outputs the incomplete result. Specifically, the incomplete result output unit 103 outputs a group that has passed a predetermined timeout time in an incomplete result table 113 as an incomplete result, and adds it to an output result list 114 and updates contents of the incomplete result table 113 by deleting the group that has passed the timeout time from the incomplete result table 113. The output result list 114 describes the result whose state has been fixed, and the incomplete result table 113 is intermediate data which describes the incomplete result whose state has not been fixed. Note that, "completion" means that a set of logs satisfies a predetermined condition, and "incomplete" means that a set of logs does not satisfy a predetermined condition.

The incomplete group processing unit 104 continues processing on the data of the incomplete group. Specifically, the incomplete group processing unit 104 compares groups of the processing batch data 112 with groups of the incomplete result table 113, and, when common groups exist, replaces data of the corresponding group of the processing batch data 112 with every data of the groups concerned. That is, the incomplete group processing unit 104 re-adds the logs included in the incomplete result whose state has not been fixed to the group of the processing batch data 112 currently being processed in real time.

The group processing unit 105 processes the group according to whether or not the content of the log included in a certain group satisfies a predetermined condition and outputs a result in which either the state of completion or incomplete is described.

The incomplete result table creation unit 106 creates the incomplete result table 113 for the group that has been determined to be incomplete by the group processing unit 105. Note that, the incomplete result table creation unit 106 sets the time added by a predetermined period from the time at which the incomplete result is preserved as the timeout time. Even in the case of an incomplete result, the state is not fixed until the timeout time passes, and the state is fixed when the timeout time has passed.

The result output unit 107 stores the result of completion and the incomplete result whose state has been fixed by timeout as result data 115 in the storage unit 11, and collectively outputs the result data 115 to a terminal or the like (not shown) which a user checking a debugging result operates. That is, the result whose state has been fixed is outputted as the result data 115.

The storage unit 11 stores the debugging program 110 that causes the control unit 10 to operate as each of the units 100 to 107, the log data 111, the processing batch data 112, the incomplete result table 113, the output result list 114, the result data 115, and the like.

Operation of Information Processing Apparatus

Next, the operation of the present embodiment will be described separately for (1) overall operation and (2) debug operation.

(1) Overall Operation

First, the debug target apparatus 2 operates based on a program to be debugged, records events accompanying the operation along with lapse of time, and sequentially outputs them as logs.

The debugging apparatus 1 sequentially receives logs from the debug target apparatus 2, batch-processes the received logs to obtain analyzable data, and executes debugging. Also, the debugging apparatus 1 outputs the debugging result to a terminal (not shown) or the like. Note that the contents of the processing of the debugging apparatus 1 will be described in detail in "(2) Debug operation" below.

(2) Debug Operation

Hereinafter, the debug operation of the debugging apparatus 1 will be described in detail.

Figure 11:
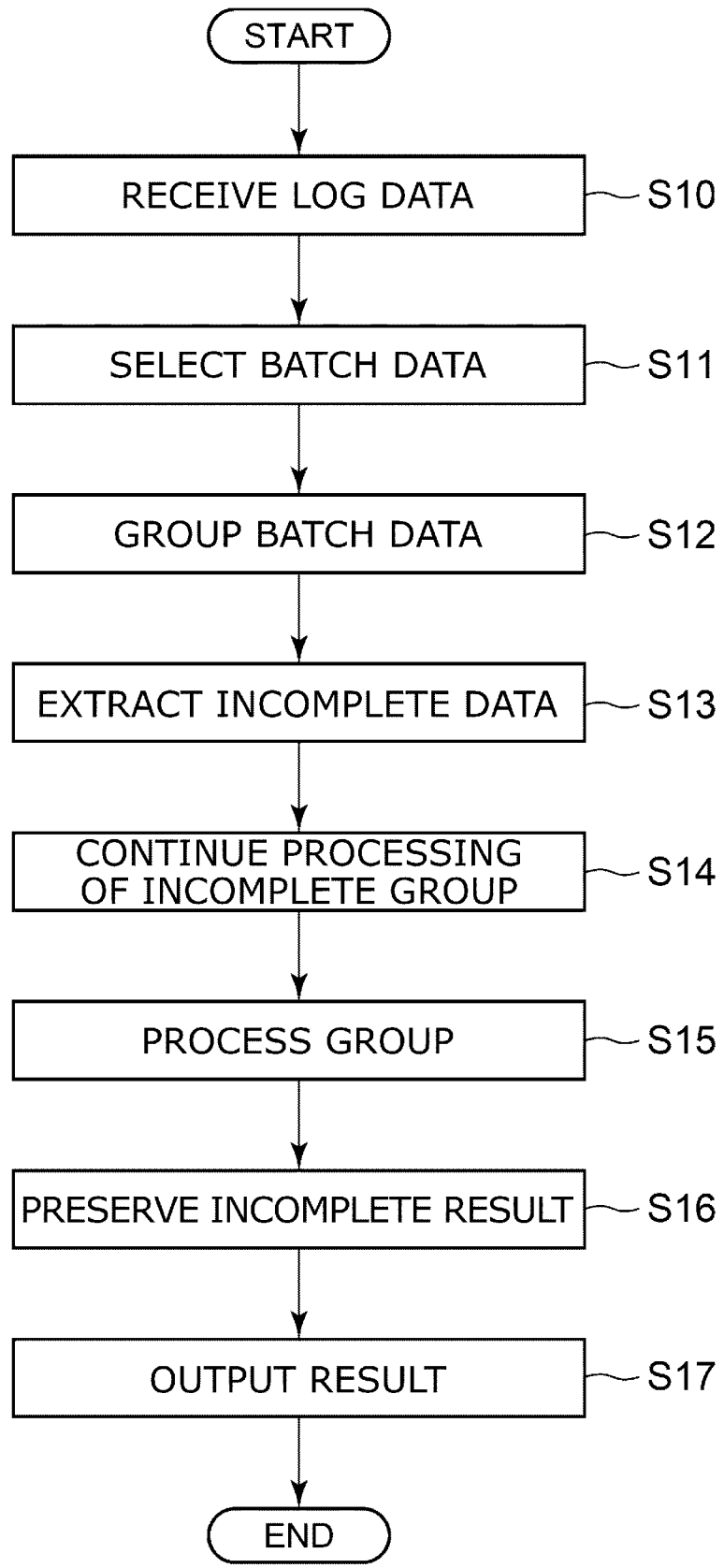
FIG. 11 is an exemplary flowchart showing an outline of a debug operation of the debugging apparatus.

FIG. 11 is an exemplary flowchart showing the outline of the debug operation of the debugging apparatus 1.

(2-1) Log Reception Operation

First, the log reception unit 100 of the debugging apparatus 1 sequentially receives, from the debug target apparatus 2, logs which are the result of operation of the program to be debugged in the debug target apparatus 2, and stores them in the storage unit 11 as the log data 111 (step S10).

FIG. 3 is an exemplary schematic diagram for explaining the log reception operation of the debugging apparatus 1.

Log data 111a is an example of the configuration of the log data 111 and includes a plurality of logs. Each of the logs is an object of an abstract class including a plurality of fields whose types can be changed. In the example shown in FIG. 3, the log data 111a includes an ID for identifying each log, a time stamp indicating a time at which the log is generated, an event ID for identifying an event corresponding to the log, a node indicating a node at which the event has occurred, an operation indicating an operation type of the event, and a parent node indicating a parent node of the node. It should be noted that a format of the log data 111a may be changed according to a system of the debug target apparatus 2.

The log reception unit 100 assigns, as an ID, a sequential number that is automatically generated upon receipt of the data string, and adds it as an additional log 1110. Note that, the log reception operation is always executed independently of the operation to be described after the batch data selection operation.

As one example, the log reception unit 100 stores the log data 111 as a JSON (JavaScript Object Notation) document in which fields and values are strictly mapped. In addition, the log reception unit 100 collects logs from applications and services running on the debug target apparatus 2 by using Fluentd, and assigns, as an ID of the log, a log reception time, a node of the debug target apparatus 2, a sequential number to be automatically generated, and the like, by Elasticsearch.

(2-2) Batch Data Selection Operation

Next, the processing data selection unit 101 selects data to be processed from the log data 111 and stores it in the storage unit 11 as the processing batch data 112 (step S11).

Figure 12:
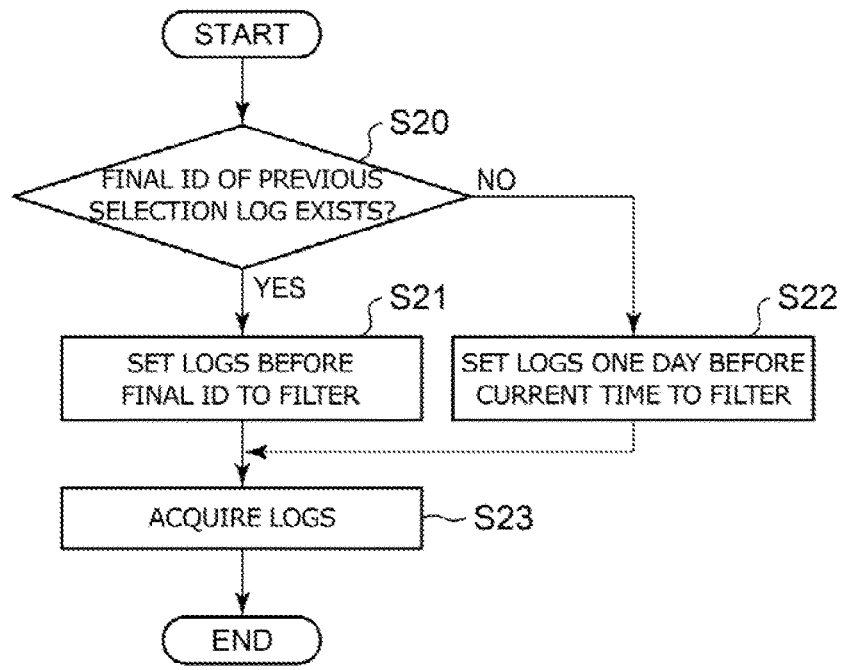
FIG. 12 is an exemplary flowchart showing an outline of a batch data selection operation of the debugging apparatus.

FIG. 4 is an exemplary schematic diagram for explaining the batch data selection operation of the debugging apparatus 1. FIG. 12 is an exemplary flowchart showing an outline of the batch data selection operation of the debugging apparatus 1.

When there is the previous batch data selection operation, the processing data selection unit 101 checks the existence of the final ID among the sequential numbers of the previously selected logs (step S20; Yes), and in the example shown in FIG. 4, the processing data selection unit 101 checks the ID of the previous selection log 1111 of the log data 111b, sets the logs before the final ID "2378965" in the filter (step S21), and acquires logs (step S23). That is, logs having the IDs "2378966" and thereafter are acquired as selection logs 1112. It should be noted that all logs of the IDs "2378966" and thereafter existing at the time of acquisition may be acquired, or a predetermined number of logs of the IDs "2378966" and thereafter may be acquired. Which acquisition is selected and a value of the predetermined number can be determined by the processing capability of the debugging apparatus 1 and/or a debugging execution apparatus 3. The frequency and timing of the batch data selection operation can be appropriately adjusted according to the operation amount of the debugging apparatus 1, such as the number of generated logs.

When there is no previous batch data selection operation (step S20; No), the processing data selection unit 101 sets logs one day before the current time as one example in the filter (step S22) and also acquires logs (Step S23). That is, logs newer than one day before are acquired as the selection logs 1112.

As one example, the processing data selection unit 101 performs the batch data selection operation by executing Elasticsearch query using Elasticsearch-Hadoop.

(2-3) Batch Data Grouping Operation

Next, the grouping unit 102 groups the processing batch data 112 for each type of operation (step S12).

FIG. 5 is an exemplary schematic diagram showing the configuration of batch data before the debugging apparatus 1 groups the batch data. FIG. 6 is an exemplary schematic diagram showing the configuration of batch data after the debugging apparatus 1 has grouped the batch data.

The grouping unit 102 extracts logs of "131145", "131146", and "131147", for example, with the event ID as a group key, from logs included in the processing batch data 112a shown in FIG. 5, respectively. Next, the grouping unit 102 rearranges and groups the log data by using the group key as a delimiter to generate processing batch data 112b.

As an example, the grouping unit 102 performs a batch data grouping operation using the "groupBy" function of Apache Spark.

(2-4) Incomplete Result Output Operation

Next, the incomplete result output unit 103 outputs the incomplete result whose state has been fixed (step S13).

Figure 7:
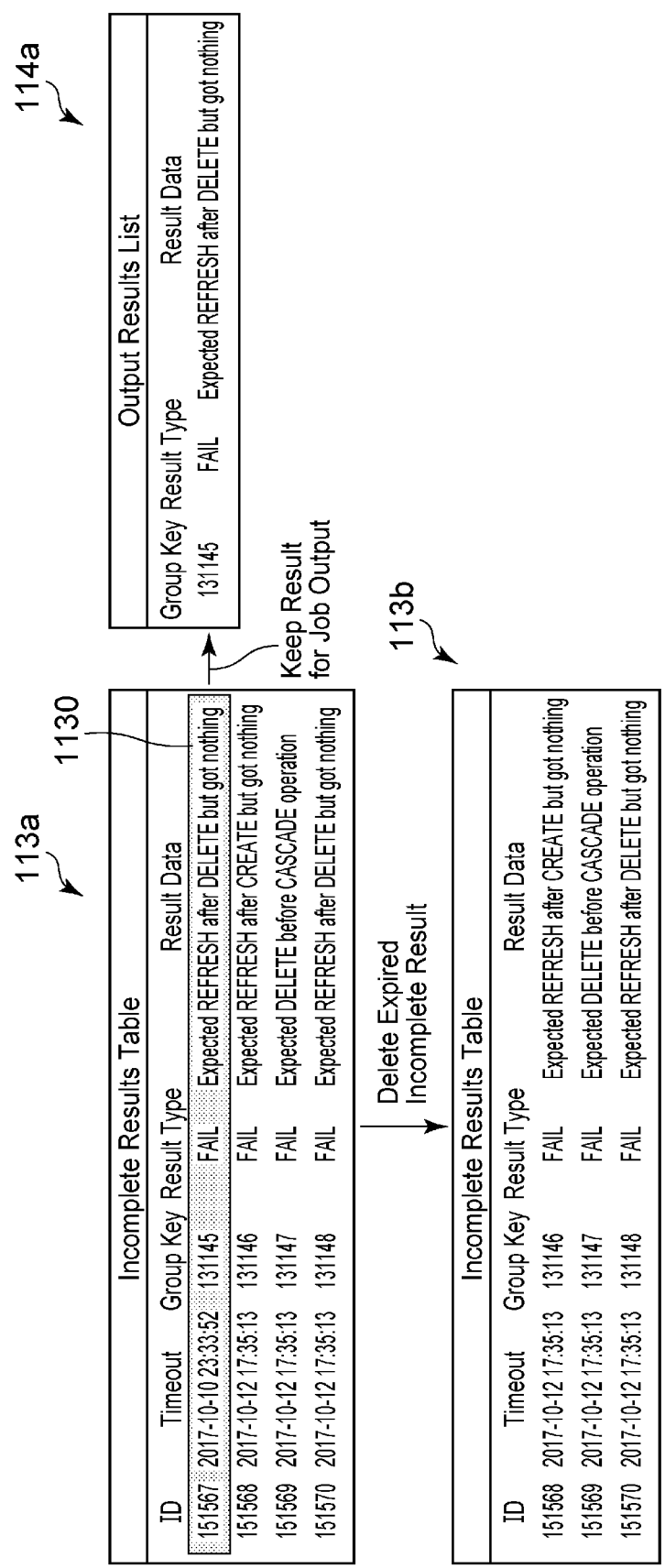
FIG. 7 is an exemplary schematic diagram for explaining an incomplete result output operation of the debugging apparatus.
Figure 13:
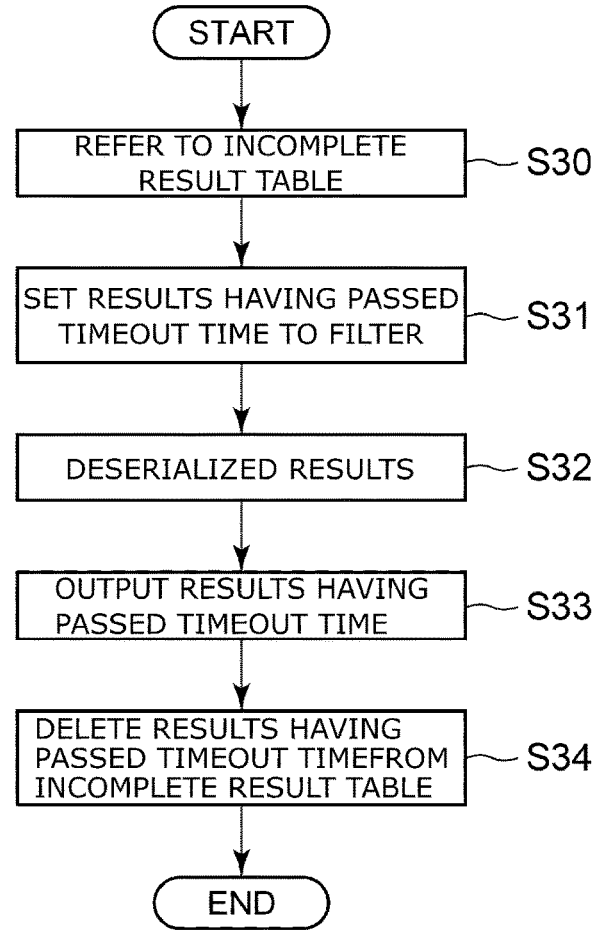
FIG. 13 is an exemplary flowchart showing an outline of an incomplete result output operation of the debugging apparatus.

FIG. 7 is an exemplary schematic diagram for explaining the incomplete result output operation of the debugging apparatus 1. FIG. 13 is an exemplary flowchart showing an outline of the incomplete result output operation of the debugging apparatus 1.

First, as shown in FIG. 7, the incomplete result output unit 103 refers to an incomplete result table 113a in which the incomplete result whose state has not been fixed is described (step S30). The incomplete result table 113a includes an ID for identifying the result, a timeout indicating a time for fixing the state of the result, a group key indicating a key of a group corresponding to the result, a result type indicating the content of the result of the group (either "PASS" indicating that the verification result is valid or "FAIL" indicating that it is invalid. The incomplete result cannot be verified because the data is not perfect at this time point, and the result type is "FAIL" as a temporary value.), and result data indicating the contents of the verification result. The method for creating the incomplete result table 113a will be described later in "(2-7) Incomplete result preserving operation".

Next, the incomplete result output unit 103 filters the results each having the timeout time before the current time (here, the current time is 00:00:00 on Oct. 11, 2017) (step S31). In addition, the incomplete result output unit 103 converts the filtered results into logs and stores the logs as the log data 111 (step S32).

Next, the incomplete result output unit 103 determines that the groups having passed the timeout time in the incomplete result table 113a is groups whose state has been fixed, and creates an output result list 114*a* from the groups (step S33). The output result list 114*a* has a group key, a result type, and result data.

In addition, since the groups that has passed the timeout time are groups whose state has been fixed, the incomplete result output unit 103 deletes the result of the groups that has passed the timeout time from the incomplete result table 113 to update the contents of the incomplete result table 113 (step S34).

Note that, as an example, the incomplete result output unit 103 executes the incomplete result output operation directly by Elasticsearch instead of Elasticsearch-Hadoop. This is because Elasticsearch-Hadoop can acquire and preserve data but cannot delete data. Also, the timeout time of the incomplete result table 113 is preserved in the form of time stamp so that Elasticsearch can easily perform filtering with the time stamp of the current time.

(2-5) Incomplete Group Continuous Processing Operation

Next, the incomplete group processing unit 104 continues processing the data of the incomplete group (step S14).

Figure 8:
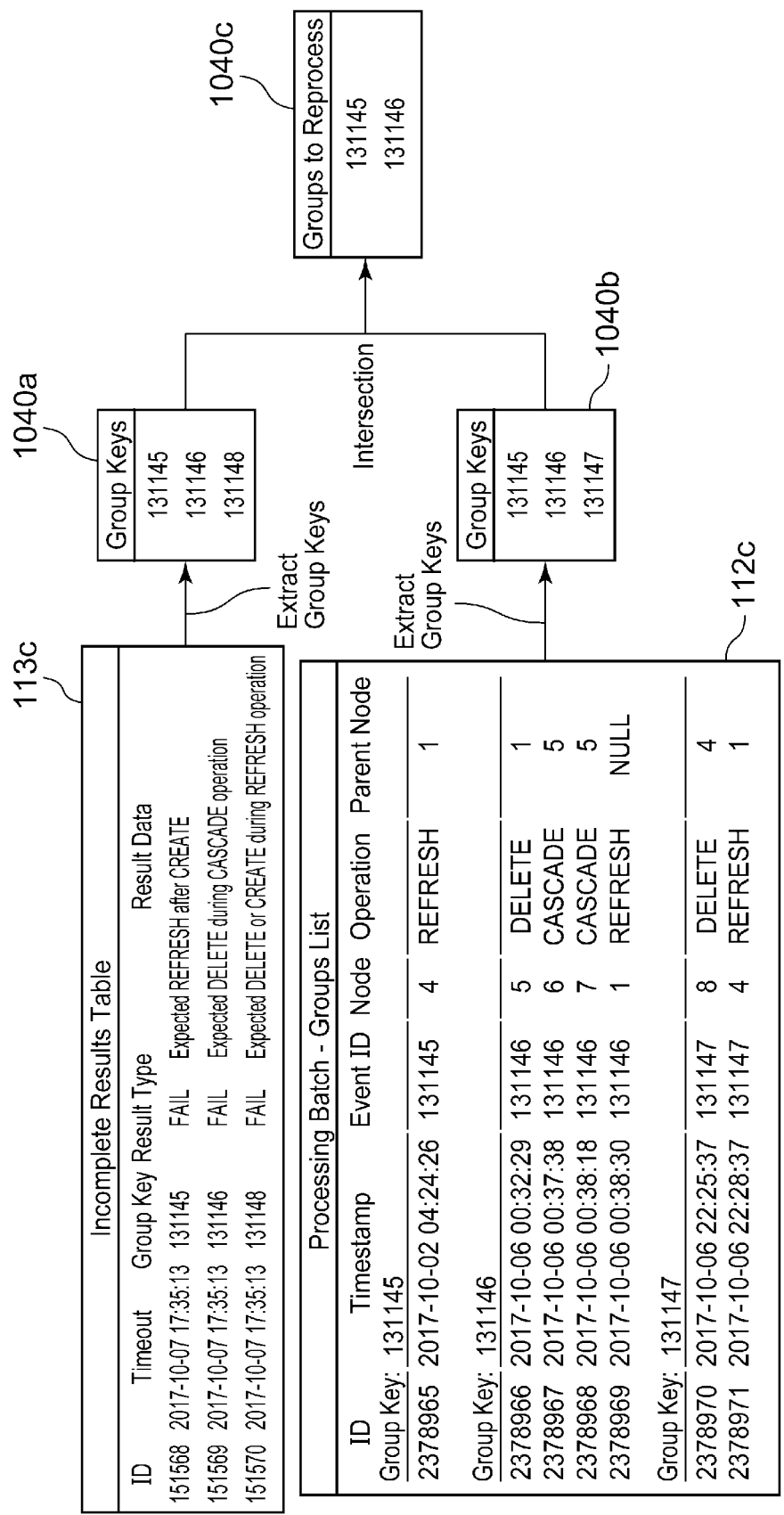
FIG. 8 is an exemplary schematic diagram for explaining a continuous processing operation of an incomplete group of the debugging apparatus.
Figure 9:
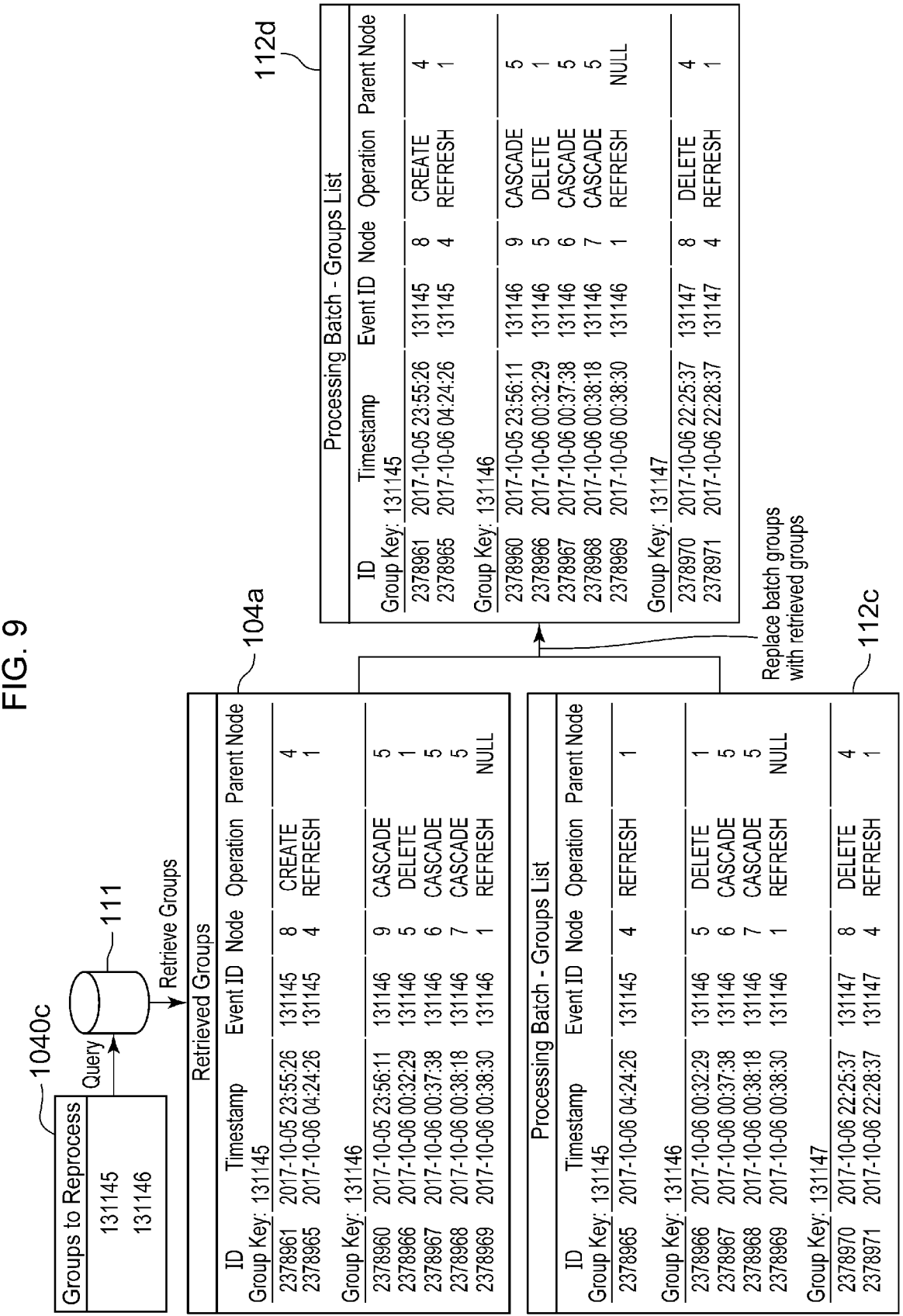
FIG. 9 is another exemplary schematic diagram for explaining the continuous processing operation of the incomplete group of the debugging apparatus.
Figure 14:
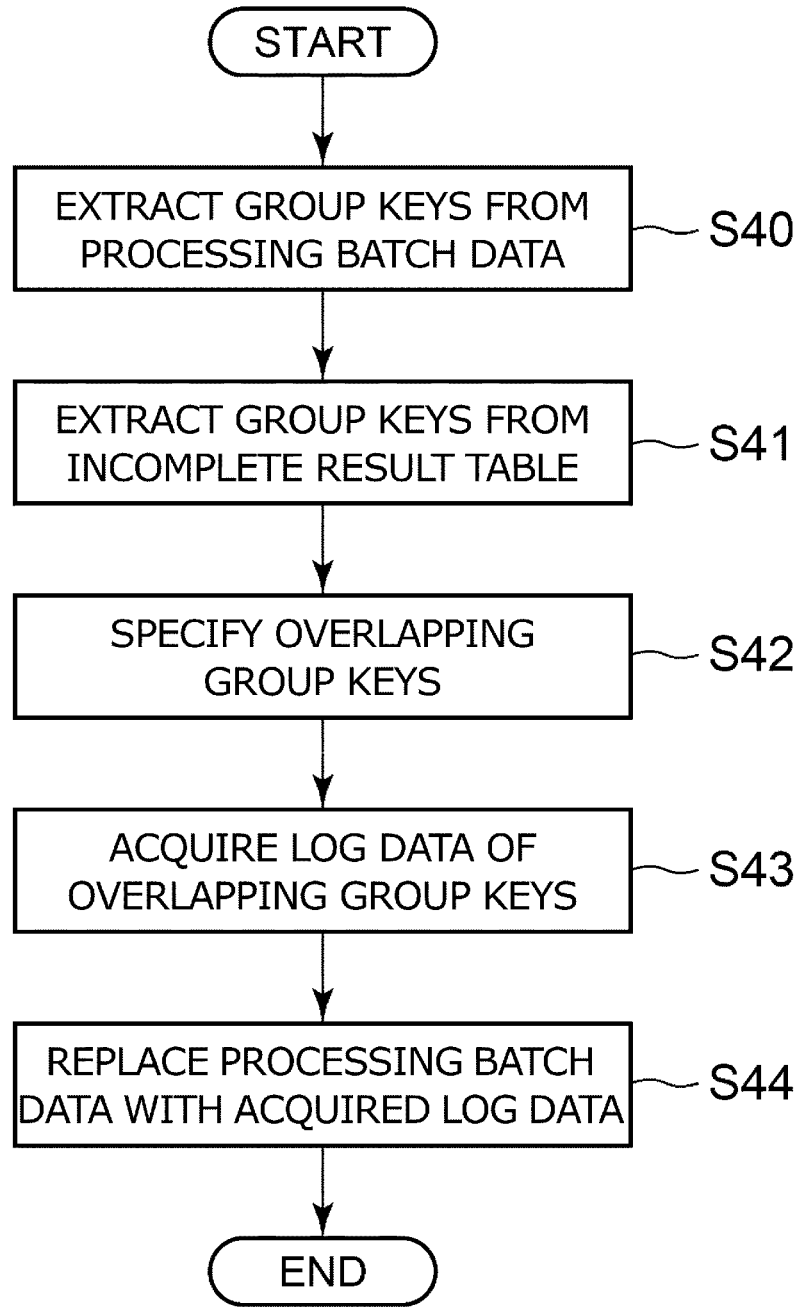
FIG. 14 is an exemplary flowchart showing an outline of a continuous processing operation of an incomplete group of the debugging apparatus.

FIG. 8 is an exemplary schematic diagram for explaining the continuous processing operation of the incomplete group of the debugging apparatus 1. FIG. 9 is another exemplary schematic diagram for explaining the continuous processing operation of the incomplete group of the debugging apparatus 1. FIG. 14 is an exemplary flowchart showing an outline of the continuous processing operation of the incomplete group of the debugging apparatus 1.

First, as shown in FIG. 8, the incomplete group processing unit 104 extracts group keys 1040*b* from processing batch data 112*c* (step S40).

Further, as shown in FIG. 8, the incomplete group processing unit 104 extracts group keys 1040*a* from an incomplete result table 113*c* (step S41).

Next, the incomplete group processing unit 104 specifies group keys 1040*c* overlapping in the group keys 1040*a* and 1040*b* (step S42).

Next, as shown in FIG. 9, the incomplete group processing unit 104 acquires logs of the overlapping group keys 1040*c* from the log data 111 to give acquired groups 104*a* (step S43), and replaces the logs of the overlapping group keys in the processing batch data 112*c* with the logs of the acquired groups 104*a* to give processing batch data 112*d* (step S44). This is because logs of groups that have been incomplete in the past exist in the processing batch data 112*d* that is newly being processed, so it is necessary to group logs of these groups. Note that, it suffices to add incomplete logs to the logs of the processing batch data 112*c*, and it is not always necessary to replace all the logs of the corresponding groups.

Note that, as an example, the incomplete group processing unit 104 performs an operation of extracting overlapping group keys in the incomplete group continuous processing operation, instead of retrieving the log data 111 using the group list of the processing batch data 112*c* by using Elasticsearch, but using an "intersection" function of Apache Spark to obtain the overlapping group keys 1040*c* from an RDD (Resilient Distributed Dataset) of the group keys 1040*b* in the processing batch data 112*c* and an RDD of the group keys 1040*a* in the incomplete result table 113*c*. This is because Elasticsearch cannot handle large inputs in search requests.

After the overlapping group keys 1040*c* are obtained, the group keys 1040*c* are acquired by filtering with the group key from Elasticsearch by using an exclusively designed plug-in, and the logs of the overlapping group keys in the processing batch data 112*c* are replaced with the logs of the acquired groups 104*a* to give the processing batch data 112*d*.

(2-6) Group Processing Operation

Next, the group processing unit 105 processes the group and outputs the result (step S15). Here, processing is a component of business logic defined by an abstract method that converts a group into a result. In addition, the result is business data for which no strict form has been stipulated except for the description of "complete" or "incomplete".

Figure 10:
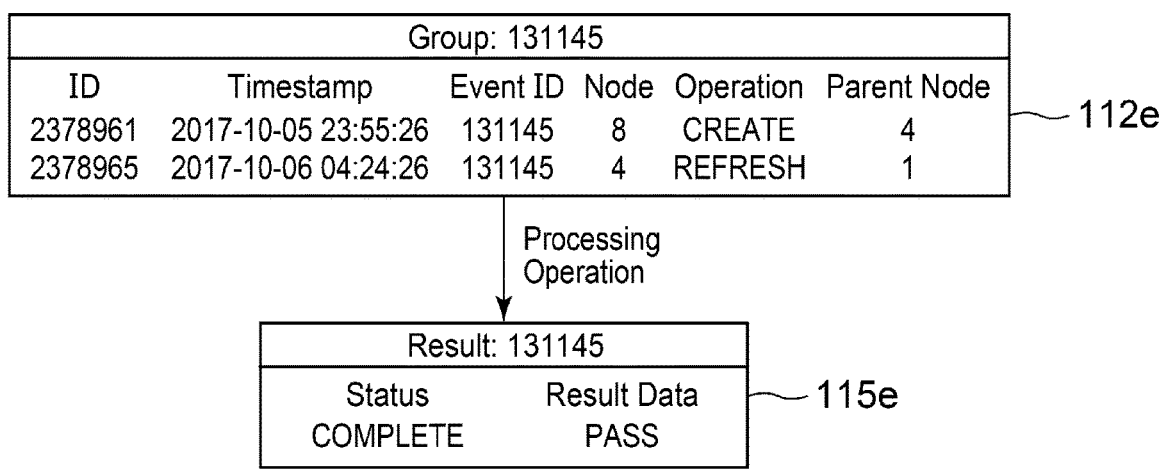
FIG. 10 is an exemplary schematic diagram for explaining a group processing operation of the debugging apparatus.
Figure 15:
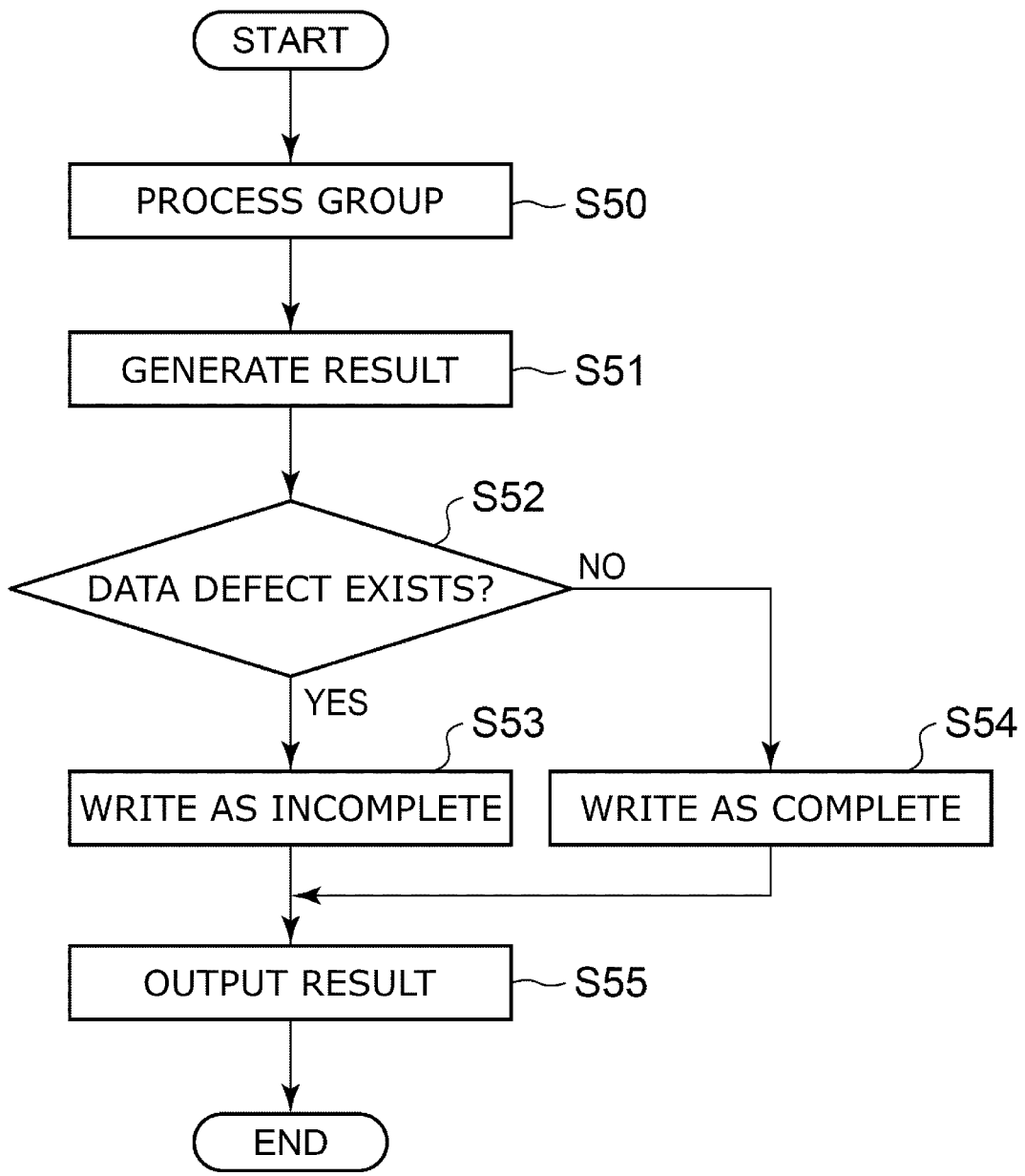
FIG. 15 is an exemplary flowchart showing an outline of a group processing operation of the debugging apparatus.

FIG. 10 is an exemplary schematic diagram for explaining the group processing operation of the debugging apparatus 1. FIG. 15 is an exemplary flowchart showing an outline of the group processing operation of the debugging apparatus 1.

As shown in FIG. 10, the group processing unit 105 starts processing of processing batch data 112*e* of a certain group (step S50).

First, the group processing unit 105 generates result data 115*e* in which no value is input (step S51). The result data 115*e* has a status indicating whether the state of the group is completed or incomplete and result data indicating a result of verification as to whether or not the log of the group satisfies a predetermined condition, and in this state, it is assumed that nothing is described in the status and result data (or a default value may be described).

Next, the group processing unit 105 prepares a typical model group in advance as a predetermined condition, compares the group with the typical model group and checks whether there is a defect of the log in the group (step S52), and when there is a defect (step S52; Yes), writes "Incomplete" in the status of the result data 115*e* (step S53). Since the result data of the result data 115*e* cannot be verified, as an example, "FAIL" is written as a provisional value.

Next, the group processing unit 105 checks whether there is a defect of the log in the group (step S52), and when there is no defect (step S52; No), writes "Complete" in the status of the result data 115*e* (Step S54). The result data of the result data 115*e* can be verified because there is no defect in the log, and if the group processing unit 105 determines that the group of logs is valid according to a predetermined verification method, "PASS" is written and if it determines that it is invalid, "FAIL" is written. Note that, the validity of the group of logs may be determined by an external device or an external function.

Next, the group processing unit 105 outputs the result data 115*e* to the storage unit 11 and stores it (step S55).

(2-7) Incomplete Result Preserving Operation

Next, the group processing unit 105 preserves the incomplete result whose status is "Incomplete" in the result data 115*e* (step S16). In addition, the incomplete result table creation unit 106 sets the time added by a predetermined period from the time at which the incomplete result is preserved to the timeout time, and creates the incomplete result table 113 as the incomplete result whose state has not been fixed.

Here, the purpose of setting the timeout is to prevent construction of incomplete results that degrade the performance of the application. For example, if the system crashes and the group does not end, the incomplete result of that group will degrade the performance of the application. That is, the timeout is a safety net for removing the group and reflecting it in the result.

At the same time, the timeout also adapts the group to the situations shown below. For example, it is possible to correctly evaluate the completion or incompletion of a group even if data is not received for a long period by setting a very long timeout for an event over several days or several weeks. Therefore, since there is a trade-off relationship between improvement in application performance and response to events over a long period, it is assumed that the timeout period is adjusted as appropriate by the user.

(2-8) Result Output Operation

Next, the result output unit 107 collectively outputs the result of completion and the result outputted due to the timeout among the incomplete results as a result whose state has been fixed, to a terminal (not shown) or the like (step S17). In other words, the result whose status is "Complete" in "(2-6) group processing operation" and the result of the output result list 114a created in "(2-4) incomplete result output operation" are collectively outputted.

As an example, the result output unit 107 re-preserves all the results in Elasticsearch in order to provide all the information concerning verification of the system to the user who requested debugging. In addition, the result output unit 107 creates, for the next batch processing, a summary of the batch processing including the number of pieces of result data having "PASS", the number of pieces of result data having "FAIL", the final ID of the processing batch data 112, and the like.

Effect of Embodiment

According to the above embodiment, by holding the incomplete result table 113 as the intermediate result data, it is possible to re-group the logs which has been determined to be incomplete in a single batch data with the logs between different batch data when having received new batch data, and to perform debugging corresponding also to an operation group that occurs on the scale of time across a plurality of pieces of batch data.

In addition, since it can deal also with an operation group that occurs on the scale of time across a plurality of pieces of batch data, even in the case of batching-processing logs of a plurality of groups having different periods required until the operation is completed, it is possible to output the debugging results in order from the completed operation without waiting for the completion of the operations of the other groups.

Note that, although it seems that in the conventional debugging apparatus, debugging is possible even by setting the period of batch data to be long so that every data of the group is included, if the period is adjusted so that all of the plural groups are debugged, there is a problem that the time required for debugging is equal to or longer than the time required for each group. In addition, in the conventional debugging apparatus, in a case where the start times of the operations corresponding to the plural types of groups are different from each other and data are sequentially received, it is only possible to perform debugging of the groups included in the batch data, and it cannot be dealt with by extending the period.

Other Embodiments

It should be noted that the invention is not limited to the above embodiment, and various modifications can be made in a scope without departing from the gist of the invention.

In the above-described embodiment, the functions of the respective units 100 to 107 of the control unit 10 are realized by the program recorded in the storage unit 11, but all or a part of each unit may be realized by hardware, such as ASIC. Further, the program used in the above-described embodiment can also be provided by being stored in a recording medium, such as a CD-ROM. Further, replacement, deletion, addition, and the like of the above-described steps described in the above embodiment can be made in a scope without departing from the gist of the invention.

A non-transitory computer-readable medium, an information processing apparatus, and a debugging system for preventing a result of debugging from becoming erroneous in a case of batch-processing a log data string sequentially received along with lapse of time and even in a case where a series of logs extend across a plurality pieces of batch data.

What is claimed is:

1. A non-transitory computer-readable medium recording an information processing program for causing a computer to function as:
   a processing data selection unit that selects logs in a predetermined range as processing batch data to be batch-processed from a log data string that is obtained by sequentially receiving logs generated accompanying an operation of a program to be debugged along with lapse of time;
   a grouping unit that groups the processing batch data selected by the processing data selection unit based on a value in a field of a log as a grouped set of logs;
   a group processing unit that, in a case where the grouped set of logs has a defect in comparison with a predetermined condition, determines that the grouped set of logs in an incomplete state and records the grouped set of logs in the incomplete state in an incomplete results table;
   an incomplete group processing unit that, in a case where after the processing batch data is selected, subsequent new processing batch data is selected and grouped as a new grouped set of logs, identifies one or more of common groups having the value in common in the field between the new grouped set of logs and the grouped set of logs in the incomplete result table, and replaces log data of the one or more of common groups in the new grouped set of logs with every log data belonging to the one or more of common groups in the grouped set of logs; and
   the group processing unit that, after the processing by the incomplete group processing unit, in a case where the new grouped set of logs has the defect in comparison with the predetermined condition, determines that the new grouped set of logs is in the incomplete state and updates the incomplete results table by recording the new grouped set of logs in the incomplete state.

2. The non-transitory computer-readable medium recording an information processing program according to claim 1, wherein the group processing unit sets a timeout time in determining the grouped set of logs in the incomplete state and records the grouped set of logs in the incomplete state as an incomplete result upon expiration of the timeout time.

3. The non-transitory computer-readable medium recording an information processing program according to claim 2, wherein the group processing unit:
   in a case where the grouped set of logs satisfies a completion condition, processes the grouped set of logs and preserves the grouped set of logs as a completion result; and causes the computer to further function as a result output unit that outputs, as a result of debugging, the incomplete result and the completion result.

4. An information processing apparatus comprising:
a memory for storing instructions; and
a processor connected to the memory wherein the processor is configured to execute the instructions for:
selecting logs in a predetermined range as processing batch data to be batch-processed from a log data string that is obtained by sequentially receiving logs generated accompanying an operation of a program to be debugged along with lapse of time;
grouping the processing batch data selected by the processing data selection unit based on a value in a field of a log as a grouped set of logs;
determining, in a case where the grouped set of logs has a defect in comparison with a predetermined condition, the grouped set of logs is in an incomplete state and recording the grouped set of logs in the incomplete state in an incomplete results table;
identifying, in a case where after the processing batch data is selected and subsequent new processing batch data is selected and grouped as a new grouped set of logs, one or more of common groups having the value in common in the field between the new grouped set of logs and the grouped set of logs in the incomplete result table,
replacing log data of the one or more of common groups in the new grouped set of logs with every log data belonging to the one or more of common groups in the grouped set of logs, and
determining, after identifying one or more of common groups, in a case where the new grouped set of logs has the defect in comparison with the predetermined condition, the new grouped set of logs is in the incomplete state and updating the incomplete results table by recording the new grouped set of logs in the incomplete state.

5. The information processing apparatus according to claim 4, wherein the processor is further configured to execute the instructions for timing out at a timing out time to determine whether the grouped set of logs is in the incomplete state and recording the grouped set of logs in the incomplete state as an incomplete result upon expiration of the timeout time.

6. The information processing apparatus according to claim 5, wherein,
in a case where the grouped set of logs satisfies a completion condition, the processor is further configured to execute the instructions for processing the grouped set of logs and preserving the grouped set of logs as a completion result; and
further outputting as a result of debugging, the incomplete result and the completion result.

7. A debugging system comprising:
a memory for storing instructions; and
a processor connected to the memory wherein the processor is configured to execute the instructions for:
sequentially outputting logs generated accompanying an operation of a program to be debugged along with lapse of time;
selecting logs in a predetermined range as processing batch data to be batch-processed from a log data string that is obtained by sequentially receiving logs generated accompanying the operation of the program to be debugged along with lapse of time,
grouping the processing batch data selected by the processing data selection unit based on a value in a field of a log as a grouped set of logs;
determining, in a case where the grouped set of logs has a defect in comparison with a predetermined condition, the grouped set of logs is in an incomplete state and recording the grouped set of logs in the incomplete state in an incomplete results table;
identifying, in a case where after the processing batch data is selected and subsequent new processing batch data is selected and grouped as a new grouped set of logs, one or more of common groups having the value in common in the field between the new grouped set of logs and the grouped set of logs in the incomplete result table,
replacing log data of the one or more of common groups in the new grouped set of logs with every log data belonging to the one or more of common groups in the grouped set of logs, and
determining, after identifying one or more of common groups, in a case where the new grouped set of logs has the defect in comparison with the predetermined condition, the new grouped set of logs is in the incomplete state and updating the incomplete results table by recording the new grouped set of logs in the incomplete state.

8. The debugging system according to claim 7, wherein the processor is further configured to execute the instructions for timing out at a timing out time to determine whether the grouped set of logs is in the incomplete state and and recording the grouped set of logs is in the incomplete state as an incomplete result upon expiration of the timeout time.

9. The debugging system according to claim 8, wherein
in a case where the grouped set of logs satisfies a completion condition, the processor is further configured to execute the instructions for processing the grouped set of logs and preserving the grouped set of logs as a completion result; and
outputting, as a result of debugging, the incomplete result and the completion result.

10. A debugging method comprising the steps of:
selecting logs in a predetermined range as processing batch data to be batch-processed from a log data string that is obtained by sequentially receiving logs generated accompanying an operation of a program to be debugged along with lapse of time, by a processing data selection;
grouping the processing batch data selected by the processing data selection unit based on a value in a field of a log as a grouped set of logs, by a grouping unit;
in a case where the grouped set of logs has a defect in comparison with a predetermined condition, determining that the grouped set of logs is in an incomplete state and recording the grouped set of logs in the incomplete state in an incomplete results table, by a group processing unit; and
in a case where after the processing batch data is selected, subsequent new processing batch data is selected and grouped as a new grouped set of logs, identifying one or more of common groups having the value in common in the field between the new grouped set of logs and the grouped set of logs in the incomplete state recorded in the incomplete results table, replacing log data of the one or more of common group in the new grouped set of logs with every log data belonging to the one or more of common groups in the grouped set of logs, and determining, after identifying one or more of common groups, in a case where the new grouped set of logs has the defect in comparison with the predetermined condition, the new grouped set of logs is in the incomplete state and updating the incomplete results table by recording the new grouped set of logs in the incomplete state.

11. The debugging method according to claim 10, wherein the step of determining times out at a timeout time for determining whether the grouped set of logs is in the incomplete state and records the grouped set of logs in the incomplete state as an incomplete result upon expiration of the timeout time.

12. The debugging method according to claim 11, wherein the step of determining that the grouped set of logs is in the incomplete state and recording the grouped set of logs as the incomplete result further includes a step of, in a case where grouped set of logs satisfies a completion condition, processing the grouped set of logs and preserving grouped set of logs as a completion result, and outputting, as a result of debugging, the incomplete result and the completion result.

* * * * *